US00RE48912E

(19) United States
(12) Reissued Patent
Bishop et al.

(10) Patent Number: US RE48,912 E
(45) Date of Reissued Patent: Feb. 1, 2022

(54) SYSTEMS, METHODS, AND APPARATUSES FOR CREATING A SHARED FILE SYSTEM BETWEEN A MAINFRAME AND DISTRIBUTED SYSTEMS

(71) Applicants: American Express Travel Related Services Company, Inc., New York, NY (US); VELOCIDATA, INC., Chicago, IL (US)

(72) Inventors: Fred Bishop, Glendale, AZ (US); Tapan Ganguly, Phoenix, AZ (US); Michael Henrichs, O'Fallon, IL (US); Curtis Howard, Lake Placid, NY (US); Ron Indeck, St. Louis, MO (US); Rajiv R. Prakash, Phoenix, AZ (US); Imran Shah, Scottsdale, AZ (US); Robin Thomas Vetrady, Phoenix, AZ (US)

(73) Assignee: American Express Travel Related Services Company, Inc., New York, NY (US)

(21) Appl. No.: 16/384,679

(22) Filed: Apr. 15, 2019

Related U.S. Patent Documents

Reissue of:
(64) Patent No.: 9,898,484
Issued: Feb. 20, 2018
Appl. No.: 14/822,770
Filed: Aug. 10, 2015

U.S. Applications:
(63) Continuation of application No. 14/822,740, filed on Aug. 10, 2015, now Pat. No. 9,898,483.

(51) Int. Cl.
*G06F 16/182* (2019.01)
*G06F 9/46* (2006.01)
(Continued)

(52) U.S. Cl.
CPC ..... *G06F 16/183* (2019.01); *G06F 9/46* (2013.01); *G06F 9/544* (2013.01); *H04L 65/60* (2013.01); *H04L 67/1097* (2013.01)

(58) Field of Classification Search
CPC ..... H04L 65/60; H04L 67/1097; G06F 9/46; G06F 16/183; G06F 9/544
See application file for complete search history.

(56) References Cited

U.S. PATENT DOCUMENTS 6,532,463 B1 * 3/2003 Robbins ..... G06F 9/541
6,718,372 B1 * 4/2004 Bober ..... G06F 16/188 709/217

(Continued)

OTHER PUBLICATIONS

Notice of Allowance dated Nov. 22, 2017 in U.S. Appl. No. 14/822,770.

(Continued)

*Primary Examiner* — Majid A Banankhah
(74) *Attorney, Agent, or Firm* — Thomas | Horstemeyer, LLP

(57) ABSTRACT

The disclosed system may comprise a mainframe computing resource, a data library, a data processing appliance, and a distributed system. The data library may be securely connected to the mainframe computing resource. The data library may be configured to receive data from the mainframe computing resource via a first interface. The data processing appliance may be configured to read and write data to the data library via a second user interface. The distributed system may be configured to receive data from the data processing appliance. The distributed system may be further configured to process the data based on a workflow from the mainframe computing system.

13 Claims, 5 Drawing Sheets

(51) Int. Cl.

| | |
|---|---|
| ***G06F 9/54*** | (2006.01) |
| ***H04L 29/06*** | (2006.01) |
| ***H04L 29/08*** | (2006.01) |

(56) References Cited

U.S. PATENT DOCUMENTS 7,289,964 B1* 10/2007 Bowman-Amuah ..... G06F 9/5038 705/1.1
9,436,591 B1* 9/2016 McCloskey ..... G06F 12/00
9,544,356 B2* 1/2017 Cuomo ..... H04L 67/1097
2002/0004835 A1* 1/2002 Yarbrough ..... H04L 29/06 709/230
2005/0005091 A1* 1/2005 Suzuki ..... G06F 21/6236 713/150
2006/0095657 A1* 5/2006 Rector ..... G06F 3/0608 711/111
2006/0149889 A1* 7/2006 Sikha ..... G06F 11/1469 711/100
2008/0263640 A1* 10/2008 Brown ..... G06F 21/6218 726/5
2011/0153697 A1* 6/2011 Nickolov ..... G06F 9/4856 707/827
2011/0172986 A1* 7/2011 Yaffe ..... G06F 9/4445 703/26
2012/0144157 A1* 6/2012 Crew ..... G06F 9/5044 712/30
2012/0296960 A1* 11/2012 Kreuzer ..... H04L 67/1097 709/203
2013/0054850 A1* 2/2013 Co ..... H04L 12/4633 710/105
2013/0318236 A1* 11/2013 Coates ..... H04L 41/22 709/224
2014/0101105 A1* 4/2014 Lee ..... G06F 17/30563 707/635
2015/0286495 A1* 10/2015 Lee ..... G06F 17/30722 718/102
2016/0088040 A1* 3/2016 Threlkeld ..... H04L 65/4076 709/219
2016/0224251 A1* 8/2016 Xu ..... G06F 3/0607
2017/0017553 A1* 1/2017 Peleg ..... G06F 11/1464
2017/0024143 A1* 1/2017 Barot ..... G06F 3/0611
2017/0068582 A1* 3/2017 Agarwal ..... G06F 11/079

OTHER PUBLICATIONS

Office Action dated May 12, 2017 in U.S. Appl. No. 14/822,770.
Notice of Allowance dated Nov. 9, 2017 in U.S. Appl. No. 14/822,740.
Issue Notification dated Jan. 31, 2018 in U.S. Appl. No. 14/822,740.
Foster I, Zhao Y, Raicu I, Lu S. Cloud computing and grid computing 360-degree compared. InGrid Computing Environments Workshop, 2008. GCE'08 Nov. 12, 2008 (pp. 1-10). Ieee.*
Rimal BP, Choi E, Lumb I. A taxonomy and survey of cloud computing systems. INC, IMS and IDC. Aug. 2009 25:44-51.*
Office Action dated May 8, 2017 in U.S. Appl. No. 14/822,740.

* cited by examiner

SYSTEMS, METHODS, AND APPARATUSES FOR CREATING A SHARED FILE SYSTEM BETWEEN A MAINFRAME AND DISTRIBUTED SYSTEMS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue application of U.S. Pat. No. 9,898,484 issued on Feb. 20, 2018* (*aka U.S. Ser. No. 14/822,770 filed on Aug. 10, 2015*) *entitled "Systems, Methods, and Apparatuses for Creating a Shared File System Between A Mainframe And Distributed Systems." The '484 patent* is a continuation of, claims priority to and the benefit of, *U.S. Pat. No. 9,898,483 issued Feb. 20, 2018* (*aka* U.S. Ser. No. 14/822,740 filed Aug. 10, 2015) entitled "Systems, Methods, and Apparatuses for Creating a Shared File System Between a Mainframe and Distributed Systems[.]."[the entire contents of which is hereby incorporated by reference] *The entire contents of both patents are hereby incorporated herein by reference for all purposes.*

FIELD

The present disclosure relates to distributed data processing systems, and more particularly, to creating a shared file system between a mainframe computing resource and distributed systems.

BACKGROUND

Typical enterprise data processing systems that include mainframes and distributed applications leverage FTP and direct connect protocols to move data between the mainframe and distributed applications. This method of data transfer and/or data sharing may be inefficient and slow. Moreover, this method of data transfer and/or data processing may require significant mainframe resources which are expensive. As such, there is a need to improve data processing capabilities and to minimize mainframe resource utilization. These improvements may be accomplished by creating a file sharing and data transfer system that is capable of quickly exchanging and processing data between mainframe and distributed environments.

SUMMARY

In various embodiments, a method of sharing data between a mainframe computing resource and a distributed system is provided. The method may include operations and/or steps comprising writing, by a mainframe computing resource, data to a data library. The method may further comprise indicating, by the mainframe computing resource, to a data processing appliance that there is data that is ready for processing. The method may also comprise removing, by the data processing appliance, mainframe tape information from the data. The method may further comprise processing, by at least one of the data processing appliance or the distributed system, the data. The method may also comprise writing, by the data processing appliance, processed data to the data library in a mainframe tape format. The method may further comprise notifying, by the data processing appliance, the mainframe computing resource that the processing data is ready for further processing by the mainframe computing resource. The notification may include at least one of a success return code or failure return code In various embodiments, the method may further comprise indicating, by the mainframe computing resource, to the data processing appliance a workflow to use for the data. The method may also comprise reading, by the data processing appliance, the data from the data library. The method may further comprise scheduling, by the mainframe computing resource, a job to process the processed data based on the return code.

In various embodiments, the method may further comprise converting, by the data processing appliance, the data from a first format to a second format. The first data format may be a mainframe communication protocol.

In various embodiments, the data processing appliance may comprise a plurality of programmable logic gates. The mainframe computing resource may be configured to communicate with the data library through a first interface. The data processing appliance may be configured to communicate with the data library through a second interface. The first interface may be isolated form the second interface.

In various embodiments, a system may comprise a mainframe computing resource, a data library, a data processing appliance, and a distributed system. The data library may be securely connected to the mainframe computing resource. The data library may be configured to receive data from the mainframe computing resource via a first interface. The data processing appliance may be configured to read and write data to the data library via a second user interface. The distributed system may be configured to receive data from the data processing appliance. The distributed system may be further configured to process the data based on a workflow from the mainframe computing system.

In various embodiments, the data processing appliance may be configured to convert the data from the data library, from a mainframe environment format to a distributed system environment format.

In various embodiments, the data processing appliance may be further configured to receive processed data from the distributed system in response to the processing, and to load the data to the data library. The processed data may be stored in a first portion of the data library designated for the data processing appliance. The first portion may be segregated from a second portion of the data library that receives data from the mainframe computing resource. The processed data from the data processing appliance may include at least one of a success return code or failure return code.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
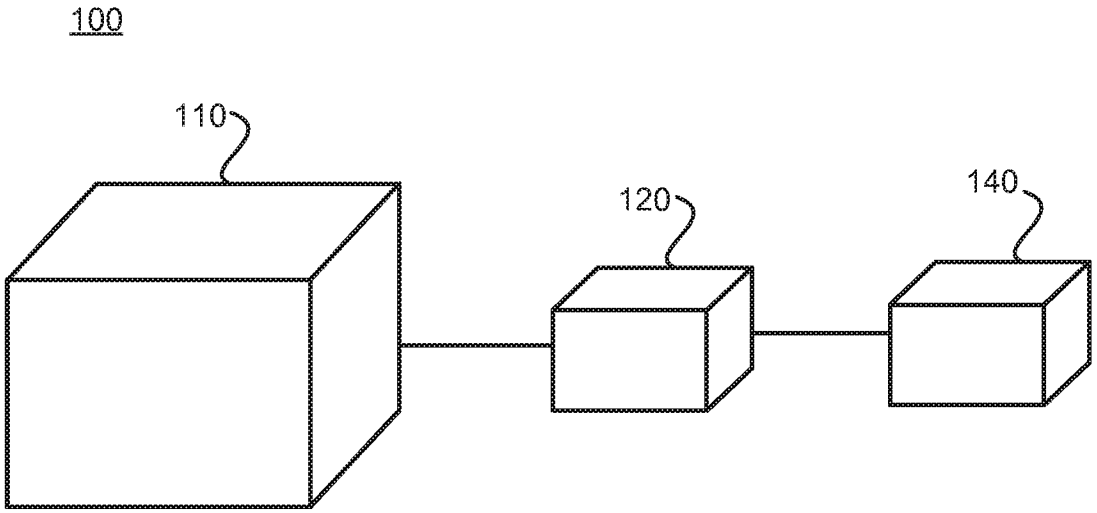
FIG. 1 is a schematic diagram that illustrates a mainframe and midrange computing system, in accordance with various embodiments.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Mainframe computing resources are typically optimized for bulk data processing and transactional processing. Mainframe computing resources are also used for high throughput processing. Traditional mainframes (e.g., IBM zSeries mainframes) can share data via a transactional service that shares one or more records with the distributed environment by exchanging messages over a message queue, web service, and/or other on line interface. Files may also be transmitted between systems using file transfer protocols such as FTP or Direct Connect. Alternatively, the distributed system can be mounted on the mainframe storage system to access files stored on the mainframe system. However, in this arrangement, the distributed system may require full administrative access to the mainframe storage system.

Providing full administrative access to servers in the distributed environment may be viewed as an unacceptable security risk to the mainframe. In this regard, the security systems that protect mainframe data are separate and user credentials cannot be shared easily. Moreover, providing the distributed environment with direct access to the mainframe file system to share files (using protocols such as Network File System (NFS)) is not typically considered secure.

Mainframe systems may also use communication protocols or data formats that are different than the communication protocols or data formats used by the distributed system. For example, the IBM zSeries typically uses Extended Binary Coded Decimal Interchange Code (EBCDIC) bit character encoding, while distributed system components and their associated operating systems (e.g., Linux operating systems, Windows operating systems, and/or the like) may use American Standard Code for Information Interchange (ASCII). The mainframe operating system supports automatic translation between EBCDIC and ASCII character sets when transmitting files, but there are often issues when translating a packed decimal between EBCDIC and ASCII. Both EBCDIC and ASCII represent characters using 8 bits to create a byte. Thus, EBCDIC and ASCII represents a number as an 8 bit byte. A packed decimal encodes two decimal digits within a single byte by encoding the numbers 0 to 9 as four bits. When translating between EBCDIC and ASCII, the translator can make mistakes because it does not always correctly understand if a byte being translated is a "normal" character or two packed decimal numbers.

In various embodiments, access to mainframe files by distributed systems may require translation since the format of the mainframe file is different than the format of the data used and there is no common storage management system which both the mainframe and the distributed system can access without actually sending the file (FTP) and converting the character encoding.

In various embodiments, the file sharing and processing appliance as described herein may be configured to directly and seamlessly integrate with mainframe processing architecture. The data processing appliance may be configured to transform, share, protect, stream, and/or otherwise process enterprise data stored on the mainframe system. In this regard, the data processing appliance may reduce or eliminate the need to transfer and/or copy the data to be processed by the distributed system via an FTP protocol. Moreover, because the data processing appliance is configured to receive and process data in real time, the data processing appliance may process mainframe data as it is received from the mainframe, rather than waiting for data processing to begin until a copy via FTP protocol has been accomplished.

In various embodiments, the data processing appliance as described herein may be configured to receive and transmit data from and/or to an enterprise mainframe system. Moreover, the data processing appliance may be configured to receive and/or transmit information to production databases, enterprise data warehouses, cloud computing systems, big data environments (e.g., HDFS), application servers, streaming data sources, and/or the like. Moreover, the data processing appliance may be configured to offload mainframe processing to obtain an 80-90% reduction in mainframe computing costs. In this regard, the data processing appliance may be capable of more efficiently and effectively processing data to reduce the consumption of mainframe data resources and/or mainframe computing resources.

In various embodiments, and with reference to FIG. 1, system 100 may be capable of creating a shared file system between a mainframe computing resource 110 and distributed computing environments. By creating a shared file system, file processing can be performed in mainframe environments or distributed environments based on the desired economics and performance. Mainframe computing resource 110 may be configured to process files with high throughput rates. However, mainframe computing may be much more expensive than performing the same processing in the distributed environment.

In various embodiments, system 100 may comprise a mainframe computing resource 110 and a data processing appliance 120. Mainframe computing resource 110 may be operatively coupled to and in electronic communication with data processing appliance 120. For example, mainframe computing resource 110 may be connected to data processing appliance 120 via a secure local area network (LAN). In this regard, mainframe computing resource 110 may be hardwired via a secure LAN to data processing appliance 120. Moreover, data processing appliance 120 may be in electronic communication with a distributed system 140. Distributed system 140 may be any suitable data processing system that is configured to process mainframe data. For example, distributed system 140 may be a real-time data processing system that is configured to receive real-time data from mainframe computing resource 110 via data processing appliance 120. In this regard, distributed system 140 may be able to stream data from mainframe computing resource 110 via data processing appliance 120 removing the typical data transfer and copy step via an FTP protocol.

In various embodiments, data processing appliance 120 may be configured as a backup storage device to share files between mainframe computing resource 110 and distributed system 140. Mainframe computing resource 110 may comprise and/or be configured with an interface to data processing appliance 120 and/or distributed system 140. Mainframe computing resource 110 may also comprise a separate first interface for data processing appliance 120 and a second interface for distributed system 140.

In various embodiments, the backup implementation may employ all intermediary library. The intermediary library may be connected to mainframe computing resource 110 using a high performance network connection and distributed system 140 may be connected using an Ethernet interface such as, for example, TC/IP. Mainframe computing resource 110 may be configured to write to the intermediary library and/or distributed system 140. In this regard, distributed system 140 and/or data processing appliance 120 may be configured to and/or capable of removing the tape semantics created when mainframe computing resource 110 writes to intermediary library and is able to sort the file. Data processing appliance 120 may write the sorted file back to the intermediary library so it could be read by mainframe computing resource 110. This functionally may reduce the processing cost by using lower cost distributed servers to sort.

In various embodiments, data processing appliance 120 may be configured to process data received from mainframe computing resource 110. In this regard, data processing appliance 120 may comprise a plurality of programmable logic gates that are configured to receive and process mainframe data in real time and/or in a batch configuration depending on the processing requests and programming of data processing appliance 120. Given the logic gate architecture of data processing appliance 120, real-time and/or batch processing of mainframe data from mainframe computing resource 110 may be possible with data processing appliance 120 that would otherwise not be possible with traditional legacy mainframe computing systems.

In various embodiments, data processing appliance 120 may be configured to perform in-line processing including, for example, data transformation (e.g., converting between formats such as EBCDIC and ASCII, restructuring data structures such as relational and XML, and/or flattening records such as SMF and EDI). Data processing appliance 120 may be further configured to include operations including, for example, sorting (e.g., using complex keys), joining (e.g., merging data), aggregation (e.g., over various data sets and windows), deduplication, data validation (e.g., based on expressions, data types, keywords, and/or the like), key generation (e.g., may incorporate multiple fields), masking (e.g., especially format-preserving), filtering (e.g., based on keywords, errors, sensitive data, and/or the like), and/or the like.

In various embodiments, the logic gates of data processing appliance 120 may be configured to program the silicon to be programmed directly. In this regard, the logic gates are configured to provide hardware speed processing operations, with no overhead of the general purpose computer moving around the code to get increased programming efficiency. Moreover, parts of the work flow being carried out data processing appliance 120 can be translated or programed into the logic gates. For example, translation of data between a mainframe format and a distributed format may be carried out via the logic gates. More generally, the workflow may be partitioned into jobs that can be performed by the parallel architectures in data processing appliance 120 such as, for example, the logic gates, CPUs, and GPUs of data processing appliance 120.

In various embodiments, data processing appliance 120 may be any suitable data processing appliance such as, for example, a stream processing appliance sold by Veloci-Data®. Data processing appliance 120 may be an engineered system that is configured to achieve extreme processing performance through the use of massively parallel computer architectures that incorporates CPUs, FPGAs and GPUs. Each appliance may be a 4U rack-mounted system that houses data processing appliance 120 components together in an engineered system.

In various embodiments, system 100 may be secured. System 100 may be secured with two interfaces on the intermediary library, such as for example, a first interface for mainframe computing resource 110 and a second interface for distributed system 140. By including separate interface, mainframe computing resource 110 and/or distributed system 140 may be configured with different permissions for files. Moreover, the separate interfaces may provide mainframe computing resource 110 and/or distributed system 140 with access to different portions and/or areas of the intermediary library.

In various embodiments, in addition to or in lieu of an intermediary library, system 100 may also comprise or be disposed on a shared storage frame used for normal data processing. In this regard, the data to be processed does not have to be created on mainframe computing resource 110 for processing on mainframe computing resource 110. In this regard, distributed system 140 may also initiate a processing job by writing a data to the intermediary library to be used by mainframe computing resource 110.

In various embodiments, data processing appliance 120 may be located in a midrange environment. Moreover, data processing appliance 120 may be configurable with a common file system that is capable of reading and writing data from and to the mainframe computing resource 110. In this regard, data processing appliance 120 may be configured to receive data from mainframe computing resource 110 in a mainframe computing format. Data processing appliance 120 may be further configured to convert the data from the mainframe format to a midrange and/or distributed system format. In response to the conversion, data processing appliance 120 and/or distributed system 140 may analyze, transform, manipulate, and/or otherwise process the converted data. The processed data may then be converted by mainframe processing appliance from the midrange or distributed format to a mainframe format that is readable and storable by mainframe computing resource 110. The converted main data in the mainframe format may be communicated from data processing appliance 120 to mainframe computing resource 110. In this regard, data processing appliance 120, in response to a data processing operation being complete, may create a job for mainframe computing resource 110 that indicates that the data has been processed by data processing appliance 120 and/or distributed system 140 and is ready to be transmitted from data processing appliance 120 to mainframe computing resource 110. The job created by data processing appliance 120 may open a gate between mainframe computing resource 110 and data processing appliance 120 to affect the transfer of the processed data from data processing appliance 120 to mainframe computing resource 110.

Figure 2:
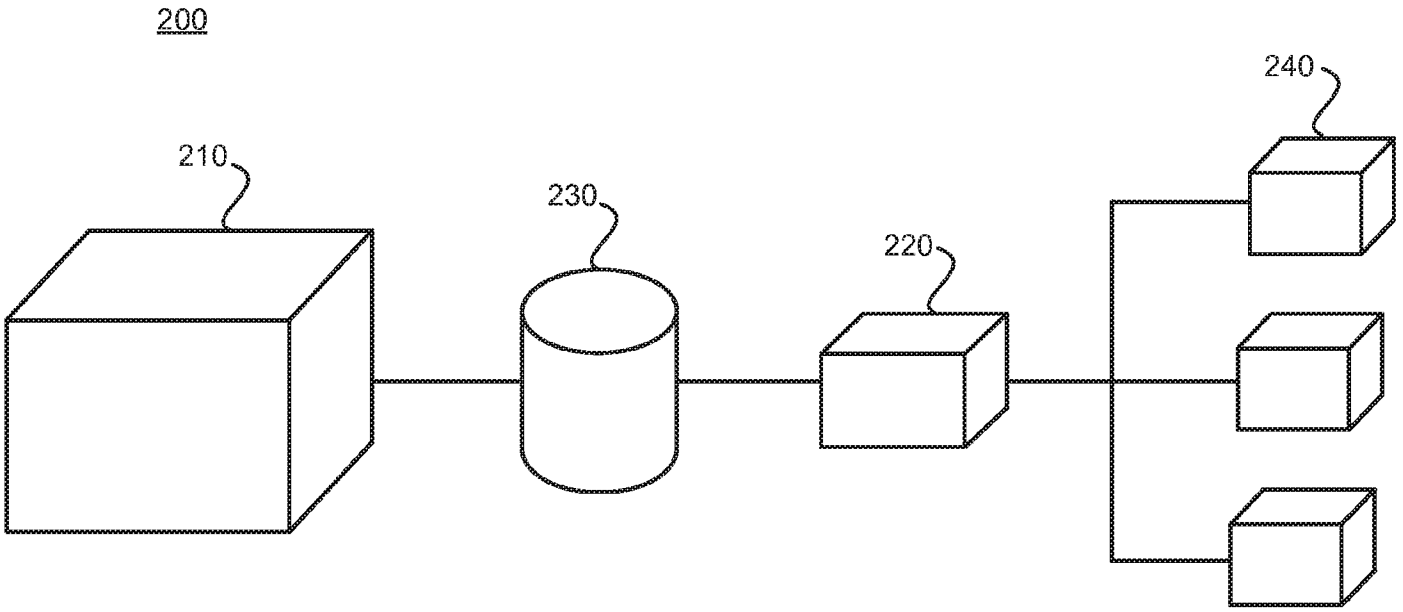
FIG. 2 is a schematic diagram that a mainframe, midrange, and distributed computing system, in accordance with various embodiments.

In various embodiments, and with reference to FIG. 2A, system 200 may comprise a mainframe computing resource 210, a data processing appliance 220, and a data library 230. Data library 230 may be configured to connect directly to mainframe computing resource 210 via a high-speed channel. In this regard, the high-speed channel may be a secure channel that is configured to transmit and receive mainframe data via data library 230. Moreover, data processing appliance 220 may be operatively coupled to and in electronic communication with data library 230 via a high-speed direct connection.

In various embodiments, data library 230 may be any suitable data storage and back-up structure. Data library 230 may be an EMC DLm Disk Library for mainframe (DLm). Data library 230 may include an enhanced virtual tape engine and FICON adapters that are configured to operate at 8 Gb/s. Data library 230 may comprise and/or be configured with hierarchical storage management (HSM), archiving, and general work tapes. This technology allows for faster backups and it reduces the time for data recalls from minutes to seconds. Data library 230 may also be integrated into data processing appliance 220.

In various embodiments, from the mainframe perspective, data processing appliance 220 and/or data library 230 may be detected and/or viewed as a tape backup device. In this regard, data processing appliance 220 and/or data library 230 can be written and read by both mainframe computing resource 210 and distributed system 240. Mainframe computing resource 210 has traditionally used tape backup devices, along with read and write files. Data processing appliance 220 may be configured as an integration service or engine between data library 230 and distributed system 240. In this regard, data processing appliance 220 operating as the integration service may normalize the files created by mainframe computing resource 210, on the back up device, so they appear as normal distributed files to distributed system 240.

In various embodiments, data processing appliance 220 may be configured to expose and preprocess data from mainframe computing resource 210 and/or data library 230 to the midrange through FTP protocols and/or NSF mounts to create a shared file system with the mainframe allowing for real-time computing and processing of mainframe data. This configuration may reduce the computing requests, jobs, and/or computing resources consumed in mainframe computing resource 210 by distributing processing responsibilities and/or jobs that would otherwise be performed by mainframe computing resource 210 to distributed system 240 via data library 230 and/or data processing appliance 220.

In various embodiments, data processing appliance 220 may be configured as a persistent file sharing system. In this regard, data processing appliance 220 may be configured to manage the data stored locally on data processing appliance 220 and/or data library 230 for the various resources consuming the data including, for example, mainframe computing resource 210 and/or distributed system 240. In this regard, data processing appliance 220 may be configured to selectively provide file semantics, data fields and encoding to distributed system 240 and/or mainframe computing resource 210 in the format and with the fields requested by each processing appliance (e.g., distributed system 240, mainframe computing resource 210, and/or the like).

In various embodiments, data library 230 may be configured to appear as a stored tape file to mainframe computing resource 210. In this regard, data library 230 may be perceived by mainframe computing resource 210 as a secure tape backup and/or secure FTP repository for data from mainframe computing resource 210. Moreover, given the strict data transfer protocols and guidelines governing data leaving and/or entering mainframe computing resource 210, data library 230 may be a stand-alone and/or integrated system. In this regard, data library 230 may be a stand-alone system with a direct connection to mainframe computing resource 210. Moreover, data library 230 may be an integral system in data processing appliance 220 that is directly connected to mainframe computing resource 210.

In various embodiments, data library 230 may be configured to act as a queue for data processing appliance 220. In this regard, mainframe computing resource 210 may be configured to continuous write and/or selectively write to data library 230 in response to receiving jobs to transmit data for processing by data processing appliance 220, distributed system 240, and/or any other suitable job indicating data transfer for processing. In this regard, data library 230 may be configured to act as a queue for mainframe computing resource 210. Data library 230 may buffer jobs to be completed by data processing appliance 220 with data provided by mainframe computing resource 210. For example, where data processing appliance 220 is processing data at the time mainframe computing resource 210 receives a job to transmit a second subset of data to data processing appliance 220 for processing, data library 230 may receive the second set of data from mainframe computing resource 210 and may store that data until data processing appliance 220 has finished processing the first set of data and is capable and/or ready to process the second set of data provided by mainframe computing resource 210. In this way, data library 230 may be configured to act as a queue to prevent mainframe computing resource 210 from timing out in response to a job being created for data processing appliance 220 when data processing appliance 220 is already processing a second job.

Figure 3:
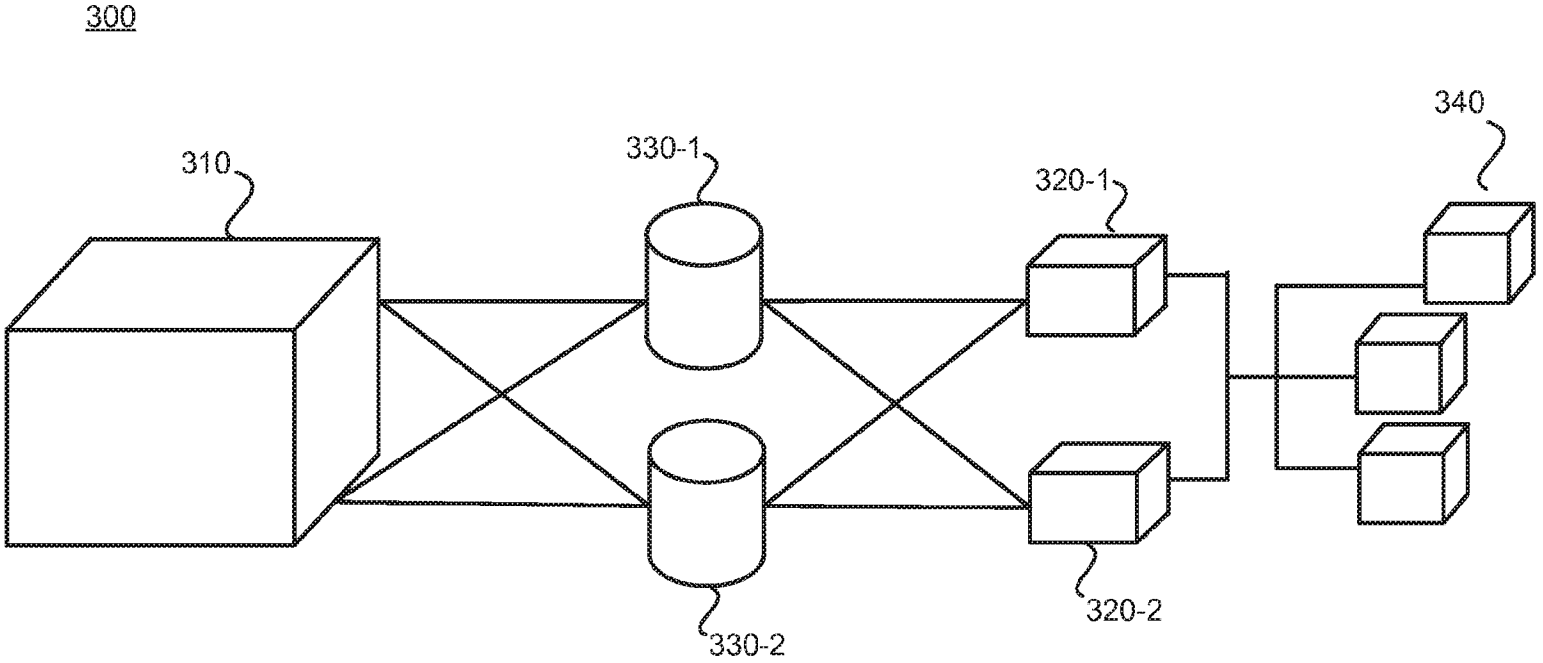
FIG. 3 is a schematic diagram that a redundant mainframe, midrange, and distributed computing system, in accordance with various embodiments.

In various embodiments, and with reference to FIG. 3, mainframe computing resource 310 may be operatively configured to a redundant data processing system. In this regard, system 300 may comprise a plurality of data libraries 330 such as, for example, data library 330-1, data library 330-2, and/or the like. Moreover, system 300 may comprise a plurality of data processing appliances 320 such as, for example, data processing appliance 320-1 and data processing appliance 320-2, and/or the like. The data library 330-1 and/or data library 330-2 may be redundantly connected to mainframe computing resource 310. Similarly, data processing appliance 320-1 and/or data processing appliance 320-2 may be redundantly connected to and/or may comprise redundant data library 330-1 and/or redundant data library 330-2 respectively. In this regard, processing jobs handled by data processing appliance 320-1 may be seamlessly handled by data processing appliance 320-2 in response to data processing appliance 320-1 experiencing a failure, power loss, and/or other issue limiting the data processing capabilities of data processing appliance 320-1. Similarly, data library 330-1 and/or data library 330-2 may seamlessly handle workload provisioned to the other data library in response to data library 330-1 and/or data library 330-2 experiencing a power failure, processing failure, and/or any other suitable failure preventing data library 330-1 and/or data library 330-2 experiencing a failure.

Figure 4:
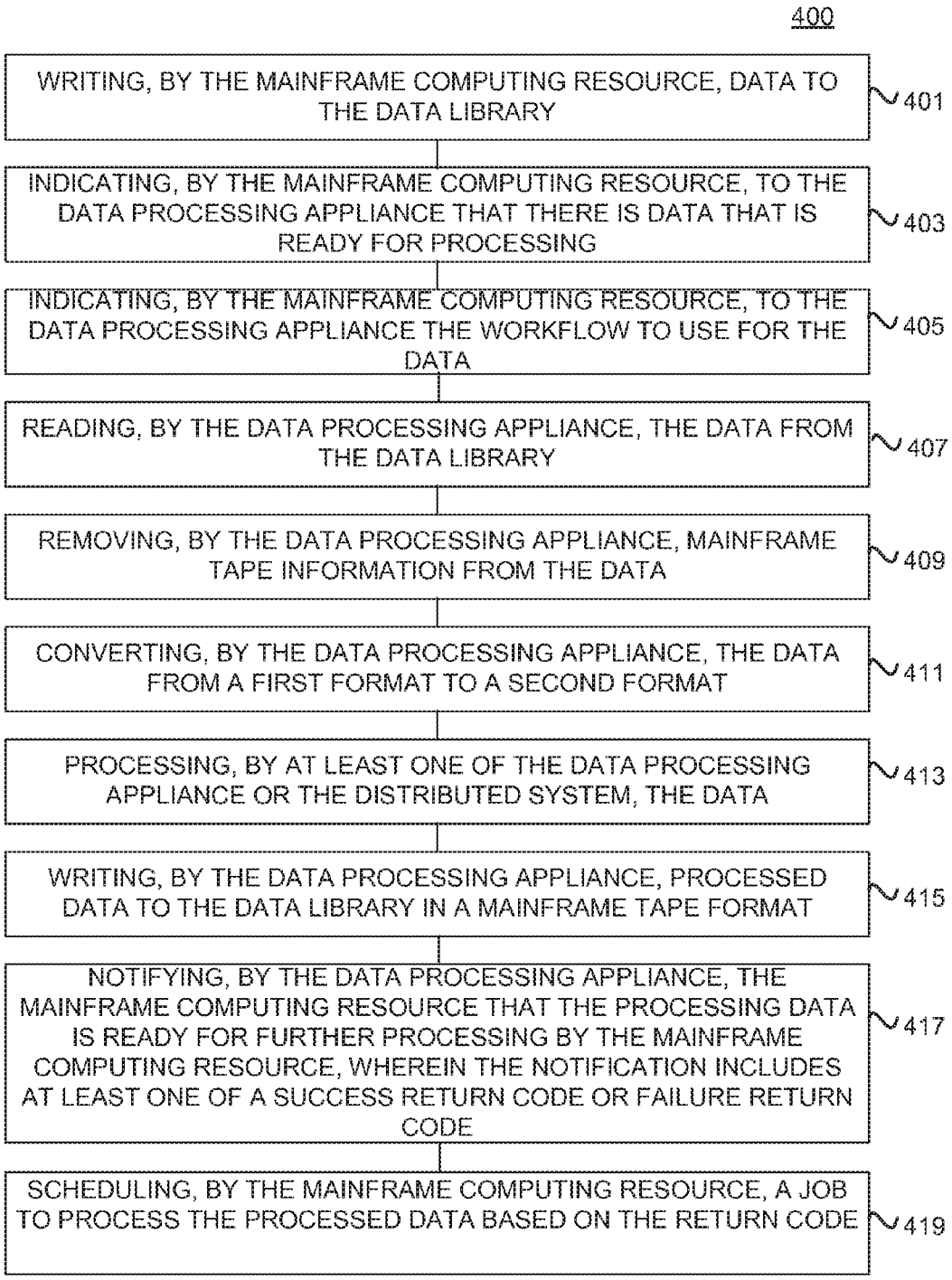
FIG. 4 is a process flow for operating a shared filed system between a mainframe, midrange, and distributed computing system, in accordance with various embodiments.

In various embodiments and with reference to FIG. 3 and FIG. 4, system 300 may be configured to perform a method 400 of processing mainframe data on distributed system 340. Method 400 may comprise writing, by mainframe computing resource 310, data to data library 330 (Step 401). Method 400 may further comprise indicating, by mainframe computing resource 310, to data processing appliance 320 that there is data that is ready for processing (Step 403). The indicating may be accomplished by a message sent by mainframe computing resource 310. The indicating may also be accomplished by setting a flag by mainframe computing resource 310 that is detectable or monitored by at least one of data processing appliance 320 and/or data library 330. In response to mainframe computing resource 310 creating a file on data library 330, mainframe computing resource 310 may create a place on the storage medium of mainframe computing resource 310 (e.g., mainframe tape catalog) for processed data. This configuration and data management arrangement creates a level a security by separating distributed system 340 and the mainframe computing environment.

In various embodiments, method 400 may further comprise indicating, by mainframe computing resource 310, to data processing appliance 320 the workflow to use for the data (Step 405). Mainframe computing resource 310 may send a message to the data processing appliance 320 with the location of the data to be processed (e.g., the tape number), the location where the data will be stored post processing (e.g., the location of the data such as, for example, the tape number of the tape to be created on data library 330 by data processing appliance 320), and the workflow to be executed by data processing appliance 320 to transform the data.

In various embodiments, method 400 may further comprise reading, by data processing appliance 320, the data from the data library 330 (Step 407). The indication from mainframe computing resource may indicate to data processing appliance 320 the particular location of the data to be processed on data library 330. Method 400 may further comprise removing, by data processing appliance 320, mainframe tape information from the data (Step 409). In this regard, data processing appliance 320 may preprocess the data to make the data suitable conversion and/or processing by distributed system 340.

In various embodiments, method 400 may further comprise converting, by data processing appliance 320, the data from a first format to a second format (Step 411). In this regard, data processing appliance 320 may be configured to translating data from, for example, EBCDIC to ASCII. Data processing appliance 320 may also be configured to unpack packed decimal, or change packed decimal to an ASCII packed decimal format. Data processing appliance 320 may be further configured to change variable length fields to fixed length fields, removing tape semantics, and/or the like.

In various embodiments, method 400 may further comprise processing, by at least one of data processing appliance 320 or distributed system 340, the data (Step 413). The data may also be processed by both data processing appliance 320 and distributed system 340. In various embodiments, data may originate from and/or be created in distributed system 340 which may then be transmitted to mainframe computing resource 310 through data processing appliance 320 and/or data library 330.

In various embodiments, method 400 may further comprise writing, by data processing appliance 320, processed data to data library 330 in a mainframe tape format. In response to the data being processed, data processing appliance 320 may be configured to convert, translate and/or otherwise format the data processed by distributed system 340 into a format that is suitable for the mainframe environment. To minimize the effect of corrupt data being mounted to data library 330, data processing appliance 320 may write the processed data to a segregated storage area or a dedicated set of disks of data library 330. Data processing appliance 320 may use a dedicated interface, if the interface is a file mount by data processing appliance 320. Data processing appliance 320 may also write to a range of tape numbers that are a dedicated storage location for data created and/or processed by data processing appliance 320 and/or distributed system 340.

In various embodiments, method 400 may further comprise notifying, by the data processing appliance, the mainframe computing resource that the processing data is ready for further processing by the mainframe computing resource, wherein the notification includes at least one of a success return code or failure return code (Step 417). In this regard, data processing appliance 320 may send a message to mainframe computing resource 310 indicating that the processed data is ready for further processing and/or storage in the mainframe environment. The indication or message may comprise the name of the processed data, and a return code on the success of the workflow executed by the data processing appliance 320.

In various embodiments, method 400 may further comprise scheduling, by mainframe computing resource 310, a job to process the processed data based on the return code (Step 419). In response to the workflow being successful, the catalog of mainframe computing resource 310 may be updated with the name or the processed data (e.g., the file). The change to the catalog may allow mainframe computing resource 310 to continue to read the file from data library 330.

In various embodiments, mainframe computing resource 310 may also be configured to communicate with and/or provide data to data processing appliance 320 via an FTP data transfer protocol. In response to receiving the data via the FTP transfer, data processing appliance 320 may execute the prescribed workflow on the data and transfer the processed data hack to mainframe computing resource 310. This process will likely take longer to process data than using system 300 with a data library 330, because the data transfer from mainframe computing resource 310 has to write the file before transmitting.

In various embodiments, data processing appliance 320 may be configured to allow distributed system 340 to read the data directly using a file system protocol such as, for example, network file system (NFS). This arraignment may remove the overhead of transmitting the file with a protocol such as FTP, while still allowing data processing appliance 320 to remove the tape semantics and reformat the file for the distributed application. The file can write back to data processing appliance 320 using NFS to send the file back to mainframe computing resource 310.

Figure 5:
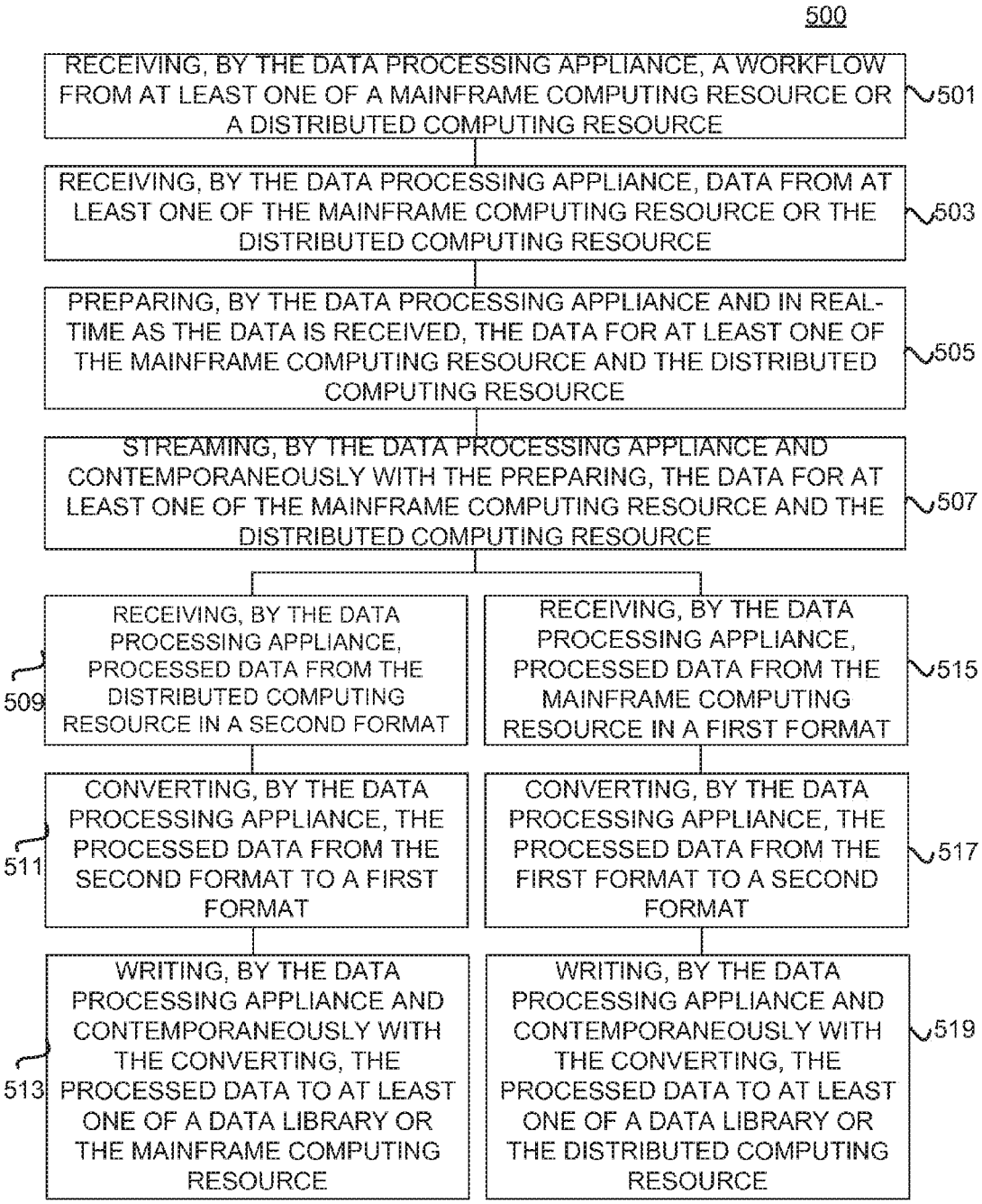
FIG. 5 is a process flow for operating a shared filed system with a data processing appliance, in accordance with various embodiments.

In various embodiments and with reference to FIG. 5, method 500 may comprise receiving, by the data processing appliance, a workflow from at least one of a mainframe computing resource or a distributed computing resource (Step 5010. The workflow, job, and/or data associated with the workflow may originate from the mainframe computing resource, the distributed computing resource, and/or the data processing appliance. As discussed herein, the data processing appliance may comprise and/or be configured with a plurality of hardware accelerators and/or a plurality of computer processing units. The plurality of hardware accelerators may include for example, programmable logic gates, graphic processing units, and/or the like. Moreover, the data processing appliance may be configured to partition or parse data received during a job for parallel processing over portions of the plurality of hardware accelerators and/or the plurality of central processing units. In this regard, the data processing appliance may be configured to optimize the processing and the speed at which the data is processed by the data processing appliance.

In various embodiments, method 500 may further comprise receiving, by the data processing appliance, data from at least one of the mainframe computing resource or the distributed computing resource (step 503). Data from the mainframe computing resource may be formatted in a first mainframe data format as discussed herein. Data from a distributed computing resource may be configured in a distributed computing format as discussed herein. Method 500 may further comprise preparing, by the data processing appliance and in real time as the data is received, the data for at least one of the mainframe computing resource and the distributed computing resource (step 505). The preparing may include data being converted to a first format and/or a mainframe data format in response to the data being transmitted to the mainframe computing resource. That preparing may also include preparing data or converting data to a second format and/or a distributed computing format in response to the data being transmitted to the distributed computing resource.

In various embodiments, method 500 may further comprise streaming by the data processing appliance at contemporaneously with the preparing, the data for at least one of the mainframe computing resource and the distributed computing resource (step 507). The streamed data may be streamed in a first format and/or a mainframe data format in response to the data being streamed to the mainframe computing appliance. Moreover, the data may be streamed in a second format and/or a distributed computing format in response to the data being streamed to the distributed computing resource.

In various embodiments, method 500 may further comprise receiving by the data processing appliance, processed data from the distributed computing resource in a second format and/or a distributed computing format (step 509). Method 500 may also comprise converting, by the data processing appliance the processed data from the second format to a first format (e.g., a mainframe data format) (step 511). Method 500 may further comprise writing, by the data processing appliance and contemporaneously with the converting, the processed data to at least one of a data library or the mainframe computing resource (Step 513).

In various embodiments, method 500 may also comprise receiving, by the data processing appliance processed, data from the mainframe computing resource m a first format (e.g., a mainframe computing format) (step 515). Method 500 may further comprise converting, by the data processing appliance the processed data from the first format to a second format (e.g., a distributed computing format) (step 517). Method 500 may further comprise writing, by the data processing appliance and contemporaneously with the converting, the processed data to at least one of a data library and the distributed computing resource (step 519). In this regard, the data processing appliance is configured to optimize the way data is received, conditioned, processed, and then returned to its source. Moreover, the data processing appliance is configured to optimize the way that data is routed and processed between mainframes and distributed systems.

In various embodiments, the systems and methods described herein may increase the efficiency and lower the cost of mainframe computing jobs. In this regard, the systems and methods described herein improve the performance of the various hardware components of distributed computing systems with mainframe, midrange and distributed components. More specifically, the systems and methods described herein reduce the time spent waiting for file to be physically transmitted between mainframe computing resource 310 and distributed system 340.

In various embodiments, the systems and methods described herein may reduce mainframe computing cost. In this regard, writing to data library 330 may cost a fraction of the cost to use FTP. Moreover, the systems and methods described herein are adaptable to various mainframe, midrange, and distributed environments allowing for enterprise wide standardization. Moreover, conventional encryption and decryption processes can be avoided where the connections of the systems described herein are hardwired.

In various embodiments, the systems and method described herein may reduce load on an enterprise network. Moreover, applications operating on distributed system 340 may NFS mount into data processing appliance 320 to read mainframe data directly and/or to perform processing operations including, for example, domain data validation, data conversion from fixed format to XML, sort-merge-split operations, data masking and encryption, load data to databases, offload extract transform load (ETL) processing, prepare data fur big data environments, and/or the like.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, computer on the distributed system may include an operating system (e.g., WINDOWS®, UNIX®, LINUX®, SOLARIS®, MacOS, and/or the like) as well as various conventional support software and drivers typically associated with computers.

The present systems or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer systems described herein also include various memories such as, for example, random access memory (RAM), a hard disk drive, a removable storage drive, a magnetic tape drive, an optical disk drive, and/or the like. The removable storage drive reads from and/or writes to a removable storage unit in a well-known manner. A removable storage unit represents a magnetic tape, optical disk, and/or the like which is read by and written to by a removable storage drive. As will be appreciated, the removable storage unit includes a computer usable storage medium having stored therein computer software and/or data.

Computer system may also include a communications interface. Communications interface allows software and data to be transferred between computer system and external devices. In various embodiments, communication between systems may be accomplished over a variety of networks using any suitable communication protocols. These networks and/or communications protocols may include, for example, transport over Ethernet, InfiniBand, or wireless, and could follow a variety of protocols including TCP, RDMA, or FICON. Remote WAN communication could also be done through VPN connections. Remote file systems could be displayed as FTP, NFS, or Samba shares. For example, a FICON communication protocol may allow the mainframe to write via FICON because the FICON may be viewed like it is a mainframe to the mainframe communication. Moreover, any protocol that the mainframe can support at tape speed, mainframe speed, real time speed and/or streaming speed would be an appropriate protocol to operate the system with the data processing appliance.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language and with the various algorithms being implemented with any combination of data structures, objects, processes, routines or other programming elements. Further, it should be noted that the system may employ any number of conventional techniques for data transmission, signaling, data processing, network control, and the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:

[receiving, by a data processing appliance, a workflow from at least one of a mainframe computing resource or a distributed computing resource;

receiving, by the data processing appliance, data from at least one of the mainframe computing resource or the distributed computing resource;

preparing, by the data processing appliance and in real-time as the data is received, the data for at least one of the mainframe computing resource or the distributed computing resource;

streaming, by the data processing appliance and contemporaneously with the preparing, the data for at least one of the mainframe computing resource or the distributed computing resource;]

receiving, by [the] *a* data processing appliance, [the] *first* data that has been processed in a second format by [the] *a* distributed computing resource;

converting, by the data processing appliance, the [processed] *first* data from the second format to a first format;

*writing, by the data processing appliance and contemporaneously with converting the first data, the first data in the first format to a first destination corresponding to at least one of a data library or a mainframe computing resource;* receiving, by the data processing appliance, [the] *second* data that has been processed in the first format by the mainframe computing resource;

converting, by the data processing appliance, the [processed] *second* data from the first format to the second format; and writing, by the data processing appliance and contemporaneously with [the] converting *the second data*, the [processed] *second* data in the second format to *a second destination corresponding to* at least one of [a] *the* data library or the distributed computing resource, wherein:

the mainframe computing resource [is configured to communicate] *communicates* securely with the data library through a first interface and the data processing appliance [is configured to communicate] *communicates* with the data library through a second interface, and the [processed] *second* data in the second format is stored in a first portion of the data library that is segregated from a second portion of the data library that *stores received second data that* had been processed in the first format by the mainframe computing resource.

2. The method of claim 1, wherein the data processing appliance comprises at least one of a plurality of hardware accelerators, or a plurality of computer processing units.

3. The method of claim 2, wherein *the plurality of hardware accelerators comprises at least one of a plurality of logic gates or a plurality of graphical processing units, and* the data processing appliance [is configured to parse] *parses* the *first* data *and the second data* for parallel processing of portions of the *first data and the second* data by the plurality of logic gates, the plurality of graphical processing units, and the plurality of computer processing units.

4. The method of claim 2, wherein the plurality of hardware accelerators comprises at least one of a plurality of logic gates or a plurality of graphical processing units.

5. The method of claim 1, wherein [the preparing includes preparing] the *first* data [in] *is converted to* the first format in response to the *first* data being [transmitted] *written* to the mainframe computing resource or [preparing] the *second* data [in] *is converted to* the second format in response to the *second* data being [transmitted] *written* to the distributed computing resource.

6. The method of claim 5, wherein the [mainframe computing] *data processing* appliance [is configured to stream] *streams* the *first* data in [at least one of] the first format to the mainframe computing [appliance or] *resource and the second data in* the second format to the distributed computing resource.

7. The method of claim 1, wherein the first interface is isolated [form] *from* the second interface.

8. A system comprising:

a data processing appliance having a processor, a tangible, non-transitory memory configured to communicate with the processor, the tangible, non-transitory memory having instructions stored thereon that, in response to execution by the processor, cause the processor to be capable of performing operations comprising:

[receiving, by the data processing appliance, a workflow from at least one of a mainframe computing resource or a distributed computing resource;

receiving, by the data processing appliance, data from at least one of the mainframe computing resource or the distributed computing resource;

preparing, by the data processing appliance and in real-time as the data is received, the data for at least one of the mainframe computing resource or the distributed computing resource;

streaming, by the data processing appliance and contemporaneously with the preparing, the data for at least one of the mainframe computing resource or the distributed computing resource;]

receiving, by [the] *a* data processing appliance, [the] *first* data that has been processed in a second format by [the] *a* distributed computing resource;

converting, by the data processing appliance, the [processed] *first* data from the second format to a first format;

writing, by the data processing appliance and contemporaneously with [the] converting *the first data*, the [processed] *first* data in the first format to *a first destination corresponding to* at least one of a data library or [the] *a* mainframe computing resource[:]*;* receiving, by the data processing appliance, [the] *second* data that has been processed in the first format by the mainframe computing resource;

converting, by the data processing appliance, the [processed] *second* data from the first format to the second format: and writing, by the data processing appliance and contemporaneously with [the] converting *the second data*, the [processed] *second* data in the second format to *a second destination corresponding to* at least one of [a] *the* data library or the distributed computing resource, wherein:

the mainframe computing resource [is configured to communicate] *communicates* securely with the data library through a first interface and the data processing appliance [is configured to communicate] *communicates* with the data library through a second interface, and the [processed] *second* data in the second format is stored in a first portion of the data library that is segregated from a second portion of the data library that *stores received second data that* had been processed in the first format by the mainframe computing resource.

9. The system of claim 8, wherein the data processing appliance comprises at least one of a plurality of hardware accelerators, or a plurality of computer processing units.

10. The system of claim 9, wherein *the plurality of hardware accelerators comprises at least one of a plurality of logic gates or a plurality of graphical processing units, and* the data processing appliance [is configured to parse] *parses* the *first* data *and the second data* for parallel processing of portions of the *first data and the second* data by the plurality of logic gates, the plurality of graphical processing units, and the plurality of computer processing units.

11. The system of claim 9, wherein the plurality of hardware accelerators comprises at least one of a plurality of logic gates or a plurality of graphical processing units.

12. The system of claim 8, wherein [the preparing includes preparing] the *first* data [in] *is converted to* a first format in response to the *first* data being [transmitted] *written* to the mainframe computing resource or [preparing] the *second* data [in] *is converted to* a second format in response to the *second* data being [transmitted] *written* to the distributed computing resource.

13. The system of claim 12, wherein the [mainframe computing] *data processing* appliance [is configured to stream] *streams* the *first* data in [at least one of] the first format to the mainframe computing [appliance or] *resource and* the *second data in the* second format to the distributed computing resource.

* * * * *